(12) United States Patent
Griffioen et al.

(10) Patent No.: US 6,501,889 B1
(45) Date of Patent: Dec. 31, 2002

(54) CABLE HAVING OPTICAL-FIBRE RIBBONS AND METHOD FOR MODIFYING THE NUMBER OF OPTICAL RIBBONS

(76) Inventors: Willem Griffioen, Koninklijke KPN N.V., P.O. Box 95321, 2509 CH (XH); Adriaan Johan Boot, Koninklijke KPN N.V., P.O. Box 95321, 2509 CH (XH)

( * ) Notice: Subject to any disclaimer, the term of this patent is extended or adjusted under 35 U.S.C. 154(b) by 0 days.

(21) Appl. No.: 09/530,748

(22) PCT Filed: Nov. 25, 1998

(86) PCT No.: PCT/EP98/07758
§ 371 (c)(1),
(2), (4) Date: Aug. 18, 2000

(87) PCT Pub. No.: WO99/28776
PCT Pub. Date: Jun. 10, 1999

(30) Foreign Application Priority Data

Nov. 27, 1997 (NL) .............................................. 1007633
Sep. 25, 1998 (NL) .............................................. 1010182

(51) Int. Cl.⁷ ................................................. G02B 6/44
(52) U.S. Cl. ........................................ 385/114; 385/109
(58) Field of Search ................................ 385/100–114

(56) References Cited

U.S. PATENT DOCUMENTS

| | | | |
|---|---|---|---|
| 5,163,116 A | 11/1992 | Oestreich et al. | 385/111 |
| 5,319,730 A | 6/1994 | Rasanen et al. | 385/114 |
| 5,561,731 A | 10/1996 | Cooke et al. | 385/114 |
| 6,052,502 A | * 4/2000 | Coleman | 385/114 |

FOREIGN PATENT DOCUMENTS

| | | |
|---|---|---|
| DE | 44 03 936 | 8/1995 |
| EP | 0 407 076 | 1/1991 |
| EP | 0 520 683 | 12/1992 |
| EP | 0 602 447 | 6/1994 |
| GB | 2 215 081 | 9/1989 |
| WO | WO 91/00536 | 1/1991 |
| WO | WO 92/01962 | 2/1992 |
| WO | WO 93/23778 | 11/1993 |

\* cited by examiner

*Primary Examiner*—Brian Sircus
*Assistant Examiner*—Michael C. Zarroli

(57) ABSTRACT

A cable comprises a cable body (1) provided with a tubular cavity (2) for including a stack (4) having a number of fibre ribbons (5), and with a preferred bending plane (X-X), e.g. through two strength elements (3) located in the cable body on either side of the cavity (2). The cavity has a mainly rectangular cross section and is provided with a pair of opposite sidewalls (2.1, 2.2), at any rate substantially, parallel to the preferred bending plane (X-X). The stack also comprises a spacer (6), included in such a manner that the stack fills the tubular cavity with some play, and the pair of opposite sidewalls provide upper and lower bounds of the stack. The said sidewalls preferably have a slight transverse convexity. The cable may be manufactured complete. The cable may also be completed after prior empty installation of the cable body. The cable permits very high fibre densities and allows for upgrading.

17 Claims, 3 Drawing Sheets

CABLE HAVING OPTICAL-FIBRE RIBBONS AND METHOD FOR MODIFYING THE NUMBER OF OPTICAL RIBBONS

BACKGROUND OF THE INVENTION

The invention lies in the field of telecommunication cables having large numbers of optical fibres. More in particular, it relates to a cable having optical-fibre ribbons according to the preamble of claim 1.

le;.5qSuch cables are known per se, e.g., from references [1], [2] and [3]. With the cables described herein, there is included a tape-shaped stack of fibre ribbons in a tubular cavity located centrally within the cable sheath and having a substantially rectangular cross section. Strength elements applied on either side of the tubular cavity determine a preferred bending plane corresponding to a preferred bending plane of the stack located in the tubular cavity. The stack in the tubular cavity extends in the longitudinal direction of the cable.

In the type of cable of reference [1], the fibre ribbons are located loosely, one on top of the other, in the stack in the tubular cavity, which is preferably filled with a water-blocking material. In the type of cable of reference [2], the tape-shaped stack extends as a waveform into the tubular cavity. Said waveform on the one hand guarantees a surplus length to enable dealing with tensile forces and temperature fluctuations, and also rendering the reeling of the cable possible. On the other hand, such waveform may prevent tilting and/or turning over of the stack, while the fibre ribbons still lie sufficiently loosely in the tubular cavity. With said known type of cable, the remaining space in the tubular cavity may be filled up with a (very weak) filler as well. The type of cable known from reference [3] comprises a strength element which, due to its shape, determines the preferred bending plane, and in which the tubular cavity having the rectangular cross section is located. Said known types of cable have the restriction that the space available in the tubular cavity is utilised, or may be utilised, insufficiently for including as large a number of fibre ribbons as possible. Moreover, said known types of cable have the restriction that they are manufactured with a specific number of fibres, and that they do not offer the option, therefore, of adjusting the number of fibres per cable to a changing need after manufacture or installation.

SUMMARY OF THE INVENTION

According to a first aspect of the invention, there is provided for a cable of the aforementioned type which, inter alia, embodies the option of dealing with the restrictions indicated above and relating to the known cables. For this purpose, the invention provides for a cable having optical-fiber ribbons of the above type, characterized as in claim 1. The dimensions of the tape-shaped spacer are such that the stack, including the fiber ribbons, can hardly turn over, or turn around. Moreover, it is possible to modify the number of fiber ribbons in the stack. In a preferred embodiment of the invention, the cable is characterized as in claim 2. As a result of such a transverse convexity of one or both sidewalls of the tubular cavity, which are parallel to the preferred bending plane of the cable body, it is achieved on the one hand that there is sufficient space for a fluid (gas or liquid) flushing through under pressure in order to be able to impel the spacer through the tubular cavity by the drag forces of such a flowing medium. On the other hand, said transverse convexity offers the option of a slight turning over of the stack and of a slight transverse bending of the individual fiber ribbons in the plane of the fiber ribbons in the stack, in the event that the cable body is subjected to curves and/or torsions, which do not correspond sufficiently to the preferred bending plane of the cable body. Such an option also promotes the capability of the cable to be reeled.

In a further preferred embodiment of the cable, the tape-shaped spacer is built up of a number of mutually separable layers. One or more of the mutually separable layers preferably consist of dummy fiber ribbons.

According to a second aspect of the invention, the object is to provide a method for modifying the number of fiber ribbons in a cable according to the invention. To this end, the invention provides for a method according to claims 9 for modifying, i.e. increasing or reducing, the number of fiber ribbons in such a cable.

According to a third aspect of the invention, the object is to provide a method for reeling a cable according to the invention. For this purpose, the invention provides for a method according to claim 14. Such a reeling method considerably reduces the extent to which undesirable tensions may occur in the optical fibers. In this case, particularly the aforementioned transverse convexity is advantageous.

In reference [4], there is disclosed a cable having a cable body provided with slot having a more or less rectangular cross section, in which there are loosely included an optical-fiber ribbon and a non-optical tape-shaped element having a surplus length evenly distributed in a undulatory pattern. The slot is further filled up with a water-blocking gel. The non-optical tape-shaped element serves to preserve the undulatory pattern of the fiber ribbon as well as possible.

In reference [5], there is disclosed a optical ribbon cable comprising a large number of cable veins. The cable veins have a body with a tubular cavity with a mainly circular cross section containing a stack of optical fiber ribbons sandwiched between two band-like fill-elements and embedded in a synthetic material in a fixed position.

The cable according to the invention may have been manufactured with a first number of fiber ribbons and a spacer, whereafter, in the event of a changed need, the number of fiber ribbons in situ may be adjusted in the installed cable. The cable body may also first be installed empty, e.g., in a duct or directly in the soil, using a conventional installation technique. Subsequently, a stack initially having a desired number of fiber ribbons and the spacer are introduced. Together with a spacer, the stack has, at least approximately, the height of the largest stack which may be introduced into the tubular cavity of the cable body. Said introduction is also effected using introductory techniques known per se, such as by blowing in using an air flow, or by flowing in using a liquid. For as long as a spacer is still present (i.e., the thickness of the spacer is greater than zero), the number of fiber ribbons in the stack may still be increased. This is done by removing the spacer present, and introducing one or more fiber ribbons to be added, whether or not together with a thinner spacer, into the vacated space. In this manner, the cable may be gradually completed at the installation site. Conversely, fiber ribbons may also be removed while applying a thicker spacer.

REFERENCES

[1] GB-A-2215081;
[2] WO-A-91/00536;
[3] U.S. Pat. No. 5,319,730;
[4] EP-A-0407076;
[5] EP-A-0602447.

The references are considered to be incorporated in the present application.

BRIEF DESCRIPTION OF THE DRAWING

The invention will be explained in greater detail by reference to the description of exemplary embodiments, reference being made to a drawing comprising the following figures.

DESCRIPTION OF EXEMPLARY EMBODIMENTS

Figure 1:
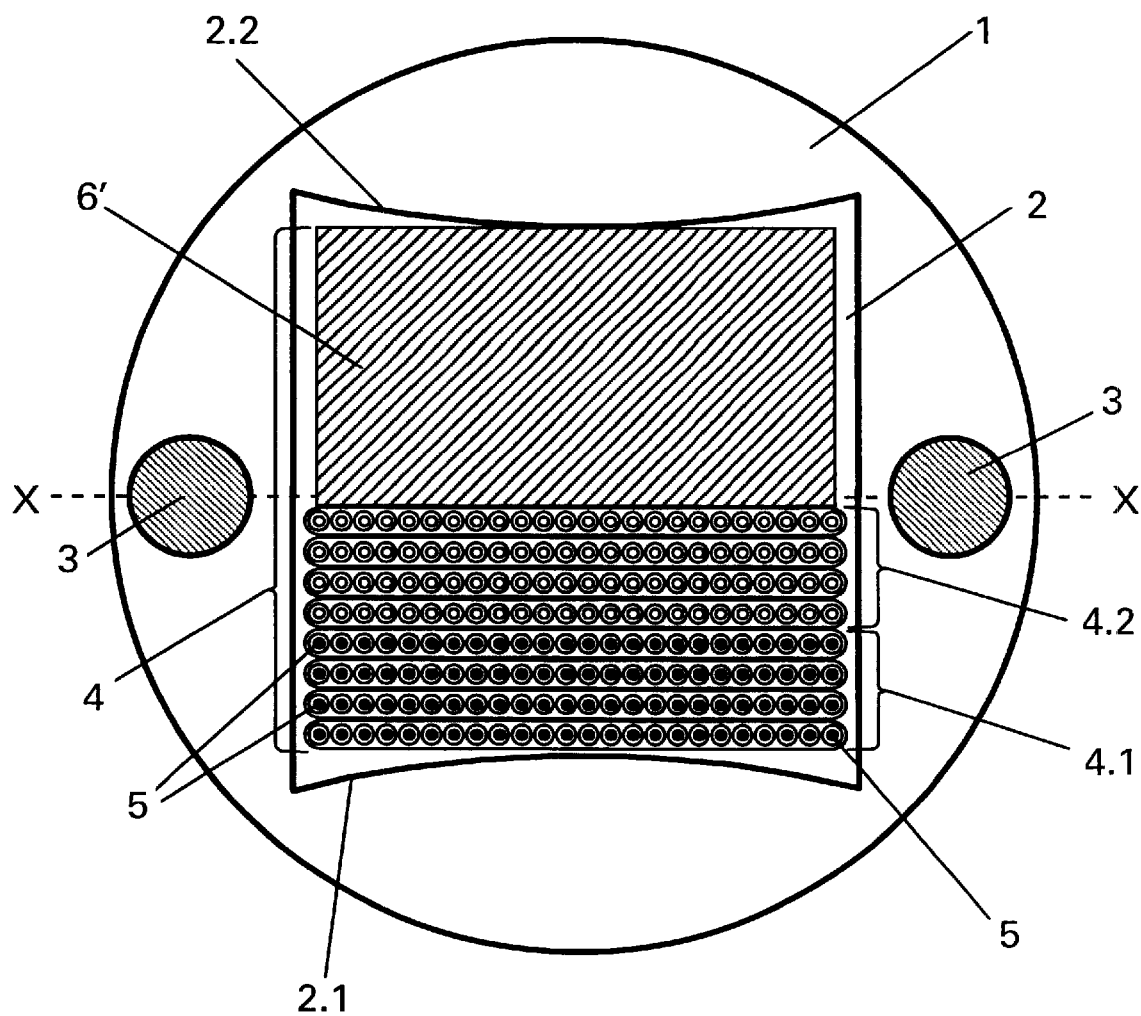
FIG. 1 schematically shows a cross section of a cable according to the invention.

The figure FIG. 1 shows, in cross section, an embodiment of a cable according to the invention. The cable comprises a tubular cable body 1 provided with a tubular cavity 2 having a substantially rectangular cross section. The cable body 1 has a preferred bending plane X-X. In the present exemplary embodiment, said preferred bending plane is realised by a plane which is stretched between two parallel strength elements 3. These strength elements are located in such a manner on either side of the cavity 2 in the cable body 1 that a pair of opposite sidewalls 2.1 and 2.2 of the cavity run in parallel, at least substantially, to the plane X-X. In the cavity 2, there is located a stack 4 which comprises a number of fibre ribbons 5 and a spacer 6, namely, in such a relative position that the sidewalls 2.1 and 2.2 are located beneath and above the stack. In the transverse direction, the sidewalls 2.1 and 2.2 are preferably somewhat convex inwards (see below).

The dimensions and the number of fibre ribbons, and the dimensions of the spacer in the stack, are such that the cavity is substantially filled therewith, albeit with some play. As a result, the fibre ribbons are not twisted together and remain well within the stack.

By way of example, FIG. 1 indicates that, apart from the spacer 6, the stack 4 comprises two substacks of fibre ribbons, of which a first substack 4.1 of four fibre ribbons was introduced into the tubular cavity 2 at an earlier stage. Subsequently, there was introduced a second substack 4.2, together with the spacer 6, which substantially fills the remainder of the tubular cavity 2. In this connection, the second substack 4.2 and the spacer 6 replaced a spacer (not shown) introduced earlier and having a volume (at least substantially) equal to the sum of the volumes of the second substack 4.2 and the spacer 6. This example shows that, according to need, there may be introduced fibre ribbons having ever smaller (thinner) spacers. In what way such introduction may be effected, is explained below with reference to FIG. 3. Due to the relatively close fit in the tubular cavity, upon introducing a new substack of fibre ribbons together with a spacer adjusted for thickness, curves in the cable body hardly constitute a problem. Even in the event of pushing in, the chance of buckling will be relatively small.

Figure 2:
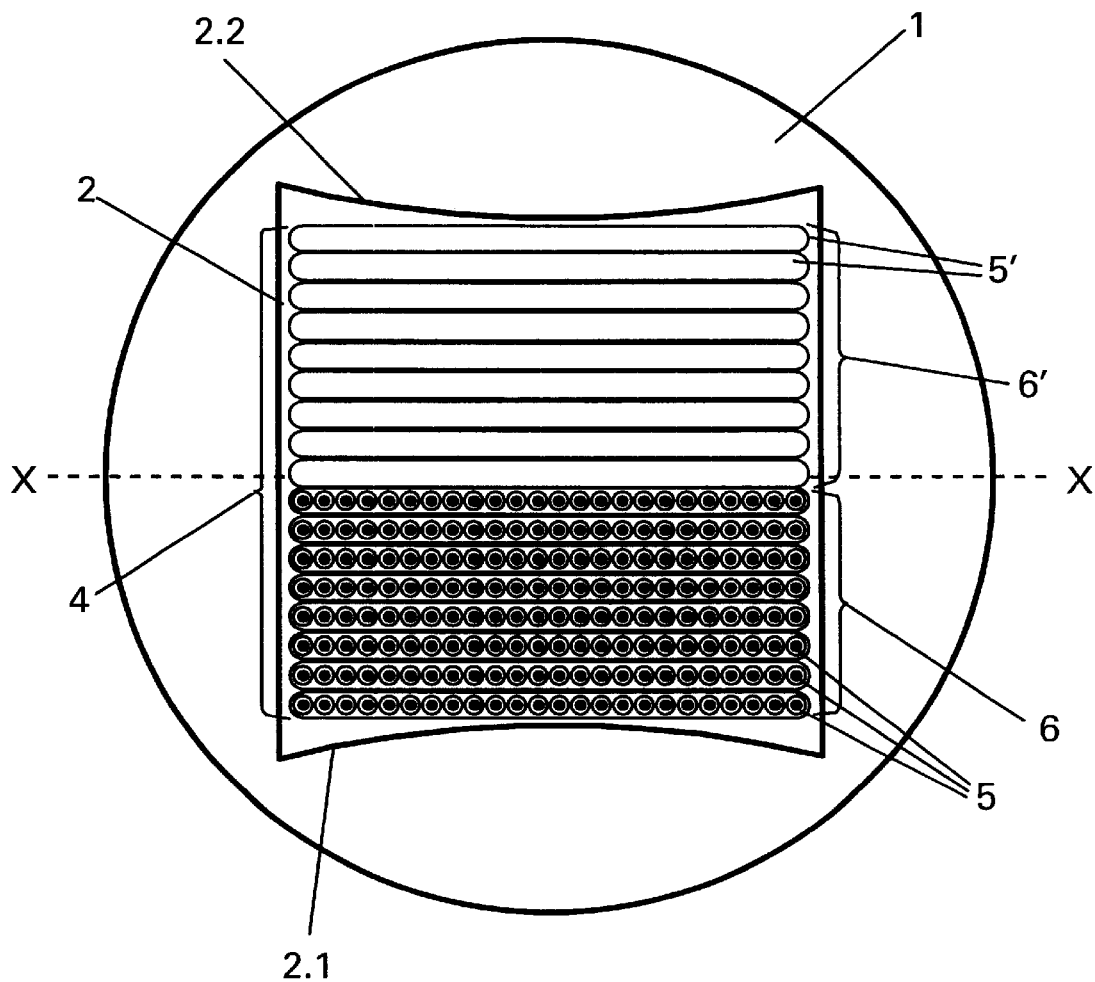
FIG. 2 schematically shows a cross section of a variant of the cable according to FIG. 1.

To possess bending properties related to the fibre ribbons, a spacer preferably has a layered structure. This is schematically shown in FIG. 2. In the tubular cavity 2 of the cable body 1, there is once again located the stack 4, this time having a spacer 6' consisting of a number of layers 5' which are separable from one another. For such layers 5', there may be chosen, e.g., dummy fibre ribbons, i.e., ribbons identical to complete optical-fibre ribbons, but without optical fibres. Such a layered spacer is easily brought to the necessary thickness and made suitable for reuse.

Figure 3:
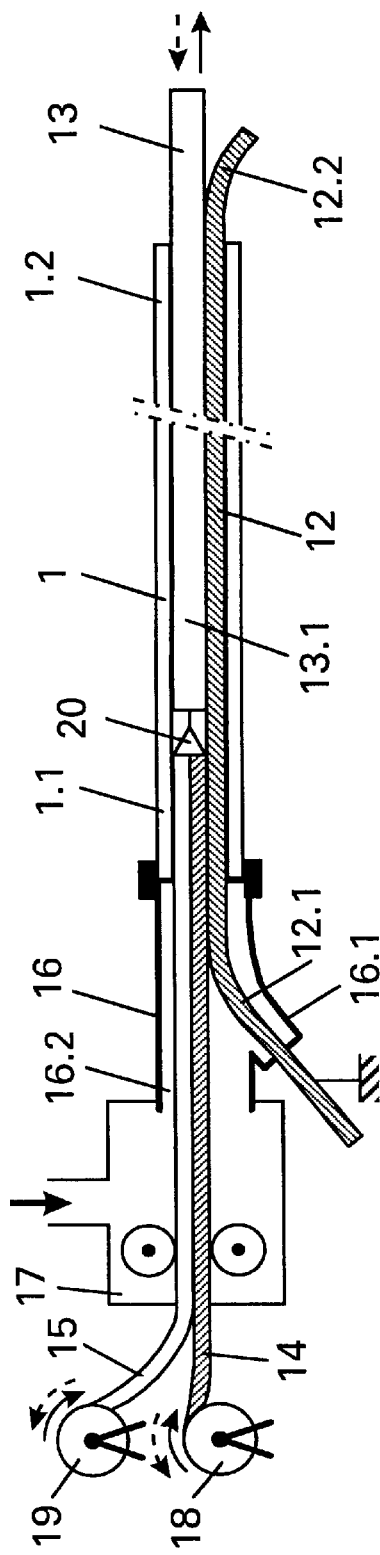
FIG. 3 schematically shows a stage during the modification of the number of fibre ribbons in a cable according to FIG. 1.

With reference to FIG. 3. there are now explained the steps of a method in which the number of fibre ribbons in the cable may be modified. The option of modification may entail both an increase and a reduction of the number of fibre ribbons. If a cable has a cable body 1 having a tubular cavity 2 (see FIG. 1 or FIG. 2), which is initially filled with a stack consisting of a first substack 12 of fibre ribbons and a first spacer 13, in order to increase the number of fibre ribbons the first spacer 13 is replaced by a second substack 14 of fibre ribbons and a second spacer 15, which together, at least substantially, have the same thickness as the first spacer 13. Said replacement may be effected as follows. On a first end 1.1 of the cable body 1, there is placed a Y-shaped inlet part 16 having a first passage 16.1, through which an end 12.1 of the first substack 12 is conducted outward and anchored. To a second passage 16.2, there is connected an inlet unit 17 known per se. The inlet unit preferably is one with which cable-shaped elements may be introduced into tubes, or may be removed therefrom using a flowing medium under pressure, i.e., flown in using a liquid or blown in using a compressed gas. The second substack 14 and the second spacer 15 are introduced from reels 18 and 19 combined into the inlet unit 17, and are fixedly coupled, through the inlet unit and using a coupling 20, to an end 13.1 of the first spacer 13. Subsequently, and synchronously with the removal of the first spacer 13, the combined second substack 14 and second spacer 15 are introduced into the tubular cavity 2 of the cable body 1 at the position of the first spacer 13. With a view to reducing the number of fibre ribbons, the cable body is initially filled with a stack formed by the two substacks 12 and 14 and the second spacer 15, and the process is carried out in the reverse direction (dotted arrows), i.e., the substack 14 and the second spacer 15 are removed and replaced by the first spacer 13. In this connection, the inlet unit 17, together with the Y-shaped inlet part 16, is connected to the other end 1.2 of the cable body 1, and the other end 12.2 of the first substack 12 of fibre ribbons is anchored. For a sufficiently powerful dragging effect of the flowing medium under pressure in the tubular cavity along a part of a stack to be shifted, there should be sufficient play between the walls of the cavity and the part in question of the stack. Viewed in cross section of the tubular cavity, the play may be expressed as a percentage of the free area (not taken up by the stack) of the full area of the cross section of the cavity.

Acceptable values for the play lie between 1 and 15%, but preferably between 5% and 10%.

An acceptable transverse convexity is achieved if the minimum height of the cavity 2 between the sidewalls 2.1 and 2.2 amounts to between 80% and 99%, but preferably to between 90% and 95% of the maximum height.

If a liquid is used for inflow, the latter should be compatible with the materials used in the cable, should possess a sufficiently low viscosity, and should not stick together with age.

The remaining space in the cavity around the stack may also be (permanently) filled with a liquid in which the stack is floating. The part of the stack to be replaced is then withdrawn therefrom while simultaneously pulling in the replacing part.

Due to the presence of a preferred bending plane X-X, the cable, viewed in the longitudinal direction, will only bend in a direction perpendicular to the plane stretched between the two strength elements. In this connection, it should be noted that a cable may also be provided with a preferred bending plane in another way than the one described; thus, e.g., a cable having an elliptical cross section without strength elements, or with a strength element having an elliptical cross section within which the tubular cavity is located (such as, e.g., disclosed in [3], will show a same bending behaviour. If the fibre ribbons are introduced into the position according to FIG. 1, that is to say, with the plane stretched between the fibres in the ribbons (i.e., their own preferred bending plane) parallel to the plane X-X, the fibre ribbons will automatically assume their preferred geometry, since to their bending behaviour, too, it applies that there occurs no difference in length mutually between the fibres in each ribbon. In this manner, the sidewalls of the tubular cavity need not exert additional forces on the stack to keep the fibre ribbons in position. Particularly in the event of wide ribbons, said forces might become large.

Some play between the ribbons and the walls of the cavity, especially as a result of the transverse convexity referred to above of the sidewalls 2.1 and 2.2, offers another option for a slight tilt of the stack of fibre ribbons and for a slight transverse bending of the individual fibre ribbons in the plane of the fibre ribbons in the stack in the event that the geometries do not fully match.

Figure 4:
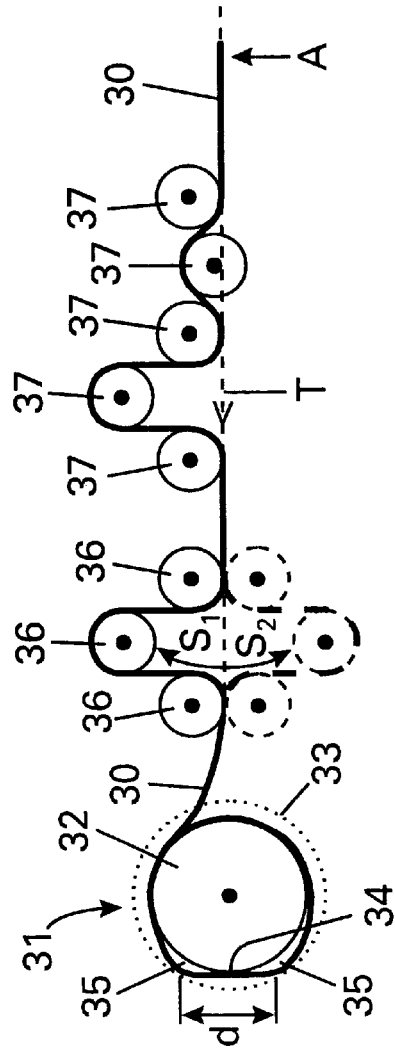
FIG. 4 schematically shows a method of reeling a cable according to the invention.

In a curve, there generally does occur some difference in length mutually between the ribbons. An outer curve is longer than an inner curve. In order to enable such difference in length, the ribbons must be capable of sliding, one along the other, sufficiently easily. The required extra length for the outer curve may then be taken from sufficient length of the ribbon and/or from averaging inner and outer curves, For this reason, it may be advantageous to introduce the fibre ribbons only after prior installation of an (empty) cable body. After all, in a cable on a reel the same ribbon would always be located in the outer curve. Particularly in the reeled state, this may cause large tensions in the fibres. Tensions in the fibres after installation of the cable should also be avoided as far as possible. Should the cable be reeled anyway, the problem of large tensions occurring in the fibres may be considerably reduced by winding the cable onto the reel twisted alternatively to the left and to the right. FIG. 4 schematically shows the steps of such a method of reeling. A cable 30, e.g., directly after leaving the production line at A (with the preferred bending plane X-X of the cable perpendicular to the plane of the drawing), is wound onto a real 31 having drum 32 and flanges 33. The drum 32 of the reel locally deviates from a cylindric shape, in such a manner that the drum is provided with a flattening 34, across which, in the event of reeling, the cable 30 runs substantially straight over a certain distance d. Such a modified reel may be realised, e.g., by providing a reel having a cylindric drum with protuberances 35 specifically shaped for that purpose. The cable is wound onto the reel in such a manner that, for a suitably chosen integer number of revolutions, e.g., for each revolution of the reel, the cable makes half a torsion revolution (i.e., a torsion revolution of 180°) alternatively to the left and to the right, with the middle of the torsion revolution always coming to lie approximately in the middle M of the flattening 34. The torsion revolution is applied to the cable by way of a first set of wheels 36, along which the cable is passed prior to reeling.

In the first set of wheels 36, the cable runs through a section, e.g., a U-shaped loop, which locally deviates from a main transport direction T. The first set of wheels 36 may be toggled 180° around the main transport direction T between two positions S1 and S2. For applying half a torsion revolution alternatively in the one and in the other direction (S-Z), the first set of wheels 36 is turned over from the one (S1 or S2) to the other position (S2 or S1). Turning over the first set of wheels 36 runs in synchronisation with the turning of the reel, in such a manner that each half torsion revolution always comes to lie approximately on the flattening 34 of the drum. In front of the set of wheels 36, which may be turned over, the cable from the production line is preferably first passed along a second set of wheels 37, in which the cable runs through an undulatory section. In said undulatory section, the cable is subjected to an undulatory movement substantially lying in a plane perpendicular to the preferred bending plane X-X of the cable, as a result of which tensions in the stack comprising the fibre ribbons and the spacer, which may occur at the position of the reel 31, are disconnected from tensions in the stack in the cable at the location A upon leaving the production line. Running through the first set of wheels 36, too, contributes towards such disconnection. The size of the undulatory movement (amplitude) preferably increases in the main transport direction T.

Another problem may arise if, upon installation, the cable body ends up (in whole or in part) in a spiral shape. In this case, the outer fibres of the ribbons in a stack after introduction into the tubular cavity will have a greater length than the fibres located more centrally in the ribbons, at any rate for as long as the ribbons remain completely flat. This effect particularly plays a role in the event of very wide ribbons. If the ribbons are sufficiently flexible in the transverse direction (e.g., shaped from various narrower sub ribbons which are loosely coupled to one another), each ribbon individually may bend in its own plane in the transverse direction, as a result of which the difference in length between the outer and the inner fibres of the ribbon may be largely neutralised. To this end, too, it is advantageous if the sidewalls 2.1 and 2.2 of the tubular cavity 2 have the transverse convexity referred to above.

The cable body may be filled either in one go, with the largest possible stack of fibre ribbons, or gradually, by adding new fibre ribbons step by step. In the latter case, it must be realised that the geometry assumed by the cable is not predictable. In most cases, the ribbons in the stack lie alternatively on top and underneath. In that case, upon introduction a substack of ribbons already present alternatively lies on, and under, the substack being introduced.

Gravitational effects may then keep the introductory length restricted. The effect of gravity may be neutralised by, upon introduction, using a liquid having a density which is preferably close to that of the fibre ribbons.

Due to the narrow fit of the stack, whether or not including the spacer, a cable consisting of a cable body filled with a stack of fibre ribbons has only a limited elongation margin. This indicates the extent to which the cable may be elongated before the fibres in the ribbons elongate as well. In the event that the cable body is installed empty in advance, the forces required for said installation are not experienced by the fibre ribbons. Of course, the forces on the fibres upon the introduction of the fibre ribbons should not be too great. The small elongation margin also requires that there be not too much difference in thermal expansion between the fibre ribbons and the cable body. This requires a suitable choice of the strength elements used.

A number of cable bodies 1 may be combined to form a composite cable body. In doing so, however, the individual cable bodies must be capable of rotating freely, in order to be able, upon bending of the composite cable body, to take up the correct position.

What is claimed is:

1. Cable having optical-fiber ribbons, comprising
a cable body (1) provided with a tubular cavity (2) located mainly centrally within the cable body and having a substantially rectangular cross section for containing a stack of fiber ribbons, which cable body has a preferred bending plane (X-X) substantially parallel to a pair of opposite side-walls (2.1, 2.2) of the tubular cavity, and a stack (4) including one or more optical-fiber ribbons (5) having mutually parallel preferred bending planes, which stack is contained in the tubular cavity of the cable body in such a manner that the preferred bending planes of the fiber ribbons in the stack are substantially parallel to the preferred bending plane of the cable body,
characterized in that
the stack (4) also includes a tape-shaped spacer (6) which is separable from the fiber ribbons in the stack, and which has dimensions such that the stack fills the tubular cavity with some play leaving open a space for a fluid flow through the tubular cavity along the stack for impelling the spacer with respect to fiber ribbons in the stack, and for a slight turning over of the stack with respect to the preferred bending plane of the cable body, the left open space having a cross section between 1% and 15% of the cross section of the cavity.

2. Cable according to claim 1, characterized in that at least one side-wall of the pair of opposite side-walls (2.1, 2.2) of the tubular cavity, which is substantially parallel to the preferred bending plane of the cable body, viewed perpendicularly to the longitudinal direction of the cable body, is slightly inwardly convex.

3. Cable according claim 2, characterized in that the minimum height of the tubular cavity between the pair of opposite side-walls including the at least one inwardly convex side-wall is between 80% and 99% of the maximum height.

4. Cable according to claim 3, characterized in that the minimum height of tubular cavity between the pair of opposite side-walls including the at least one inwardly convex side-wall is between 90% and 95% of the maximum height.

5. Cable according to claim 1, characterized in that the play corresponds with a left open space having a cross section between 5% and 10% of the cross section of the cavity.

6. Cable according to claim 1, characterized in that the tape-shaped spacer (6') is built up of a number of mutually separable layers (5').

7. Cable according to claim 6, characterized in that one or more of the mutually separable layers are formed by dummy fiber ribbons.

8. Cable according to claim 1, characterized in that the remaining space in the cavity is filled with a liquid in which the stack is floating, at least approximately.

9. Method for modifying the number of optical-fiber ribbons (5) in a cable which is installed between a starting point (1.1) and a finishing point (1.2), which cable comprises a cable body (1) provided with a tubular cavity (2) having a substantially rectangular cross section and containing a ribbon stack including a number of fiber ribbons, characterized in that in a first state of the cable the stack includes a tape-shaped first spacer (13) and a first substack (12) of fiber ribbons, and in a second state of the cable the stack includes a tape-shaped second spacer (15) and a second substack (14) of fiber ribbons, and the method comprises a replacement step in which as to increase the number of fiber ribbons in the cable the first spacer (13) is replaced by the second spacer (15) and the second substack (14), thereby changing from the first state into the second state of the cable, and as to decrease the number of fiber ribbons the second spacer (15) and the second substack (14) are replaced by the first spacer (13), thereby changing from the second state to the first state of the cable, in said first state the cavity containing the first substack (12) and the first spacer (13), the first spacer having first dimensions as to form in combination with the first substack a first stack (12, 13), the first stack filling the tubular cavity with some play, and in said second stage the tubular cavity containing the first substack (12), the second substack (14) and the second spacer (15) having second dimensions as to form in combination with the first and second substacks (12, 14) a second stack (12, 14, 15), the second stack filling the tubular cavity with some play, and said replacement step being carried out by means of a fluid flow through the space left open by said some play in the tubular cavity along the stack.

10. Method according to claim 9, characterized in that the replacement step for increasing the number of optical-fiber ribbons comprises the following substeps:

releasing ends (12.1, 12.2, 13.1) of the first substack (12) and of the first spacer (13) at the starting point (1.1) and the finishing point (1.2) of the cable, combining front ends of the second substack (14) and the second spacer (15) to form a combined front end (20), fixedly coupling the combined front end (20) to the released end (13.1) of the first spacer (13), removing, by exerting tensile forces, the first spacer (13) from the tubular cavity at the finishing point (1.2) of the cable and therewith dragging the combined front end (20), while in combination further introducing the second substack (14) and the second spacer (15), with the released ends (12.1, 12.2) of the first substack (12) being kept in place.

11. Method according to claim 9, characterized in that the replacement step for decreasing the number of optical-fiber ribbons comprises the following substeps:

releasing ends of the first and second substacks (12, 14) and of the second spacer (15) at the starting and finishing points (1.1, 1.2) of the cable, combining trailing ends of the second substack (14) and the second spacer (15) to form a combined trailing end (20) at the finishing point (1.2) of the cable, fixedly coupling the combined trailing end (20) to a front end (13.1) of the first spacer (13), removing, by exerting tensile forces, the second spacer (15) and the second substack (14) in combination from the tubular cavity at the starting point (1.1) of the cable and therewith dragging the combined trailing end (20), while further introducing the first spacer (13), with the ends (12.1, 12.2) of the first substack (12) being kept in place.

12. Method according to claim 10, characterized in that the tensile forces exerted during the substep of removing and simultaneously drawing in, include dragging forces which are generated by a fluid which, under pressure and having a relatively high speed, flows from the starting point through the tubular cavity to the finishing point.

13. Method according to any one of the claim 9, characterized in that either the first substack or the second spacer has zero thickness.

14. Method for winding a cable (30) according to claim 1 onto a reel (31) having a substantially cylindrical drum (32), which cable is provided with a preferred bending plane, characterized in that the cable is wound onto the reel with half a torsion revolution per integer number of reel revolutions, the preferred bending plane being reversed, alternatively in the one and in the other direction.

15. Method according to claim 14, characterized in that half the torsion revolution in the cable is applied by passing the cable, prior to the reeling, through a set of transport wheels (36), in which the cable runs through a U-shaped section with respect to a main transport line (T), which set of transport wheels may be rotated over an angle of approx. 180° around an axis coinciding with the main transport line (T) between a first and a second position ($S_1$, $S_2$), the turning over of the set of transport wheels from the one to the other position running in synchronization with the reeling.

16. Method according to claim 15, characterized in that the torsion revolution in the cable substantially comes to lie on, and above, a flattening (34) with which the drum (32) of the reel is provided and across which the cable, during the reeling, runs straight over a certain distance (d) with every reel revolution.

17. Method according to claim 15, characterized in that the cable, prior to the application of half the torsion revolution, is passed through a further set of transport wheels (37) in which the cable runs through an undulatory section with respect to a main transport line (T).

* * * * *

UNITED STATES PATENT AND TRADEMARK OFFICE
CERTIFICATE OF CORRECTION

PATENT NO.      : 6,501,889 B1
DATED           : December 31, 2002
INVENTOR(S)     : Willem Griffioen and Adriaan Johan Boot It is certified that error appears in the above-identified patent and that said Letters Patent is hereby corrected as shown below:

<u>Title page,</u>
Please insert Item [73] and Item [74] to read:

-- [73]  Assignee: Koninklijke KPN N.V., Netherlands
   [74]  *Attorney, Agent, or Firm*: Michaelson & Wallace, Peter L. Michaelson --

Signed and Sealed this

Eleventh Day of March, 2003

JAMES E. ROGAN
*Director of the United States Patent and Trademark Office*